T. STENHOUSE.
MECHANISM FOR MAKING GLASS ARTICLES.
APPLICATION FILED OCT. 23, 1914. RENEWED SEPT. 23, 1916.

1,265,827.

Patented May 14, 1918.
2 SHEETS—SHEET 1.

Witnesses:
Raphael Netter
Charles Rohrs

Inventor
Thomas Stenhouse
By his Attorney
Clarence O'Kent

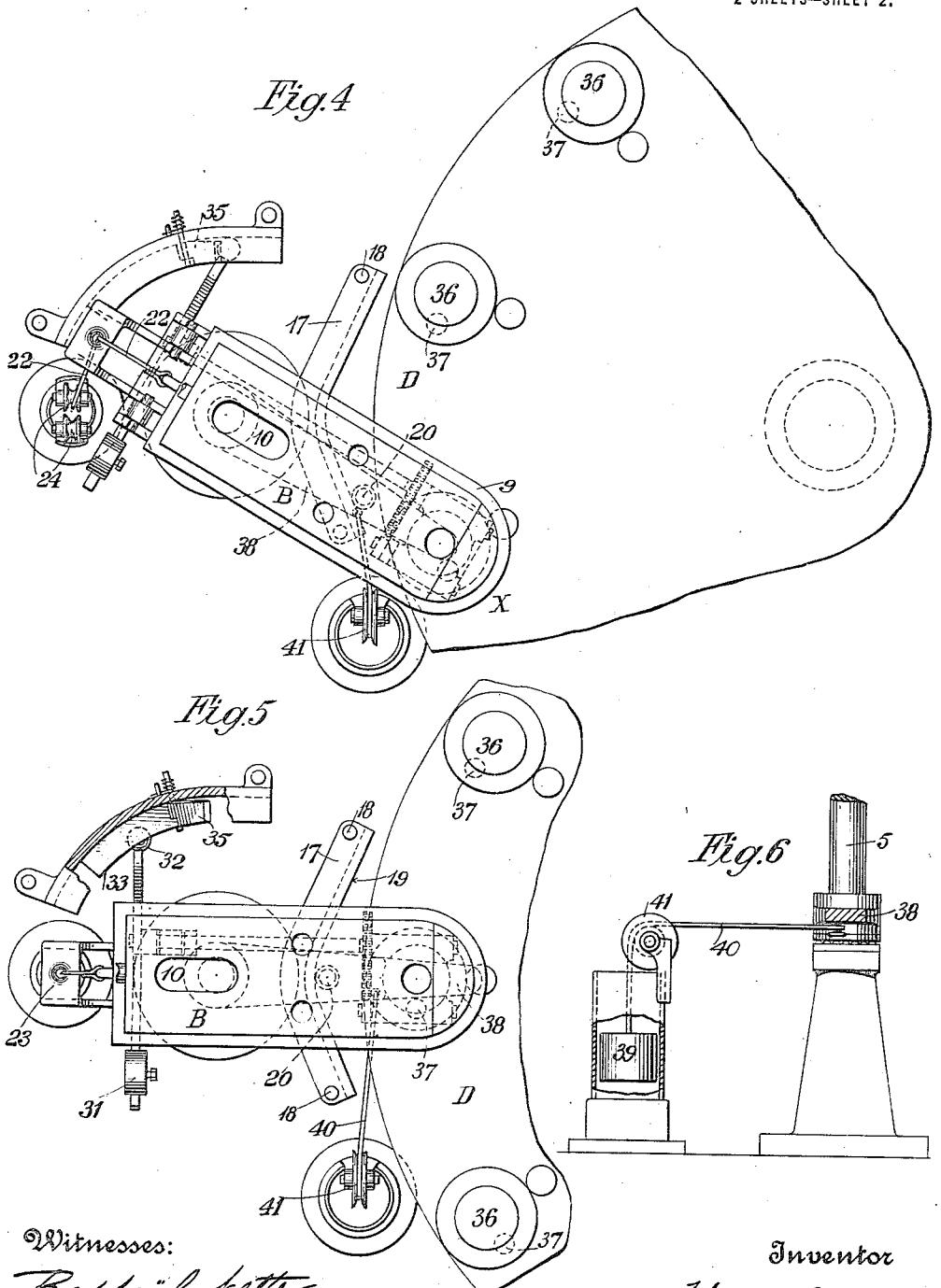

UNITED STATES PATENT OFFICE.

THOMAS STENHOUSE, OF WASHINGTON, PENNSYLVANIA, ASSIGNOR TO HAZEL-ATLAS GLASS CO., OF WHEELING, WEST VIRGINIA, A CORPORATION OF WEST VIRGINIA.

MECHANISM FOR MAKING GLASS ARTICLES.

1,265,827.  Specification of Letters Patent.  Patented May 14, 1918.

Application filed October 23, 1914, Serial No. 868,169. Renewed September 23, 1916. Serial No. 121,907.

*To all whom it may concern:*

Be it known that I, THOMAS STENHOUSE, a citizen of the United States, residing at Washington, Washington county, Pennsylvania, have invented new and useful Improvements in Mechanisms for Making Glass Articles, of which the following is a specification, reference being had to the accompanying drawings, in which—

Figure 1:
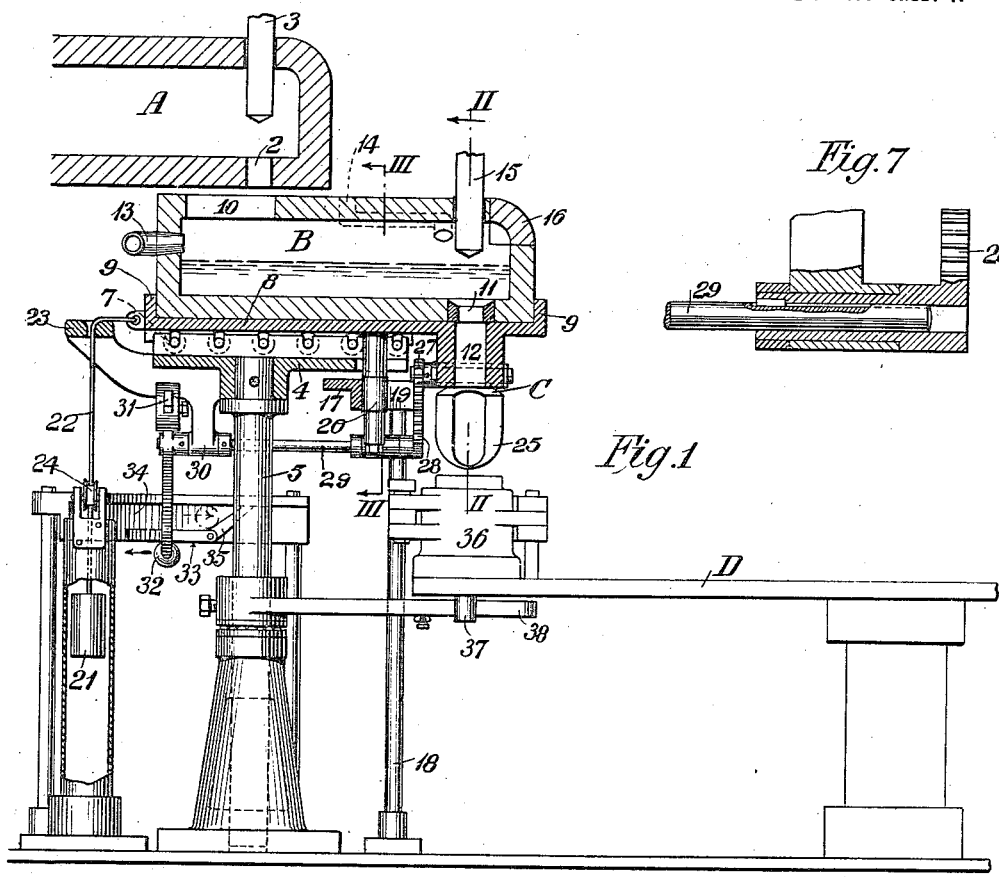
Figure 7:
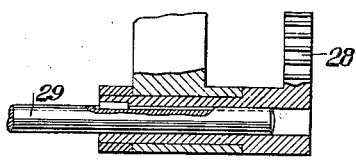
Figures 2, 3:
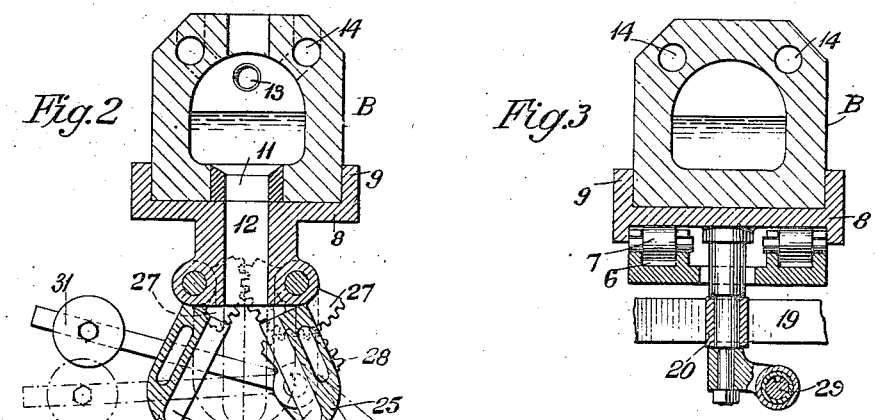

Figure 1 is an elevation partly in section, of apparatus embodying my invention; Fig. 2 is a section on lines II—II of Fig. 1; Fig. 3 is a section on lines III—III of Fig. 1; Fig. 4 is a plan showing the movable spout at the forward end of its movement; Fig. 5 is a plan showing the spout in central position; Fig. 6 is a detail of the mechanism for returning the movable spout to its initial discharging position; and Fig. 7 is a detail of a telescoping connection by which the cut-off mechanism is operated.

My invention relates to mechanisms for making articles of glass, in which the glass flows from the furnace mouth and is controlled and directed by automatic means into a plurality of molds. My invention consists in mechanism permitting the use of a continuously operated mold carrier, as distinguished from an intermittently operated mold carrier, which is usually employed in mechanisms operated in connection with a flowing spout. My invention also consists in the construction and coöperation of the parts which I shall hereafter describe and claim.

Referring to the drawings A indicates the usual delivery spout of a furnace or tank; B an auxiliary spout or reservoir; C the cut-off mechanism, and D the mold carrier or mold table. The spout A has the usual opening 2, in which is positioned the usual stopper or block 3, by which the quantity of glass flowing through the opening 2 may be controlled, and by which also the flow of glass may be cut off entirely. Beneath the spout A is the auxiliary spout B, which is positioned on a supporting member 4, which, in turn, is mounted on the shaft 5, by the actuation of which a limited oscillatory movement is transmitted to the spout B. Seated in the recesses 6 in the upper face of the base 4 are roller bearings 7, which support the base plate 8 of the auxiliary spout B. The base plate 8 has an upwardly extending flange 9, which takes about the sides of the auxiliary spout B, and holds it securely therein.

The auxiliary spout B, which is preferably comprised of fire clay, has, in its upper face, an elongated aperture 10, which is adapted to register in all positions of the spout B with the opening 2 in the bottom of the spout A. At the forward end of the auxiliary spout B is a discharge opening or orifice 11, from which the glass flows through an aperture 12 in the base plate 8 to the cut-off mechanism C. The glass in the auxiliary spout B is kept in molten condition by a blast of gas, which is admitted through the nozzle 13, and the products of combustion are withdrawn through the flues 14 in the upper portion of the auxiliary spout B. The amount of glass flowing through the discharge orifice 11 is controlled by the usual plug 15. The removable cap 16 permits access to the plug 15 and to the interior of the spout B, in case repairs are needed. Beneath the forward end of the base plate 8 is a track 17, mounted on the standards 18, which preferably has an outwardly flaring face 19, against which a roller 20, depending from the under side of the base plate 8, is designed to bear. A counter weight 21 is attached to the rear end of the base plate by a cable 22, which causes the roller 20 to bear at all times against the concave face 19 of the track 17. The cable 22 is led from the rear end of the plate 8 through a bearing 23 at the rear end of the support 4, and is guided by the pulleys 24 with which it is in contact as the spout B oscillates from side to side about the shaft 5.

The cut-off mechanism C, I have shown to be in the form of counterpart members 25 of clam-shell shape, which are preferably water cooled, to prevent the molten glass from sticking thereto. The edges of the members 25 are sharpened, so that, as they come together, they will cut the glass. When the members 25 come together they form a chamber or receptacle 26 in which the glass is retained while the spout B is being moved into discharging position. The actuating mechanism for the members 25 preferably consists in the complementary gears 27 one of which is in mesh with a segmental gear 28 which has a telescoping engagement with the shaft 29 by which it is driven. The rear end of the shaft 29 is seated in a fixed bearing 30 on the support 4, and attached to the rear end of the shaft 29 and adjacent the bearing 30 is a counterweighted lever 31, the unweighted end 32 of which by the forward movement of the spout B will be caused to travel beneath the flange 33 during which the members 25 will remain in discharging position; when, however, the end 32 reaches the rear end of the flange 33, the counter weight on the other end will cause it to tilt upward so that it will enter and travel on the return movement of the spout B through the slot 34. The lever 31, by tilting upwardly, rotates the shaft 29 which operates the gears 27 to close the members 25 and the members 25 are maintained in such position during the return movement of the spout B and until again on forward movement the end 32 has come in contact with the spring finger 35 which deflects the end downwardly which thereby again rotates the shaft 29 causing the members 25 to again move to open or discharging position.

The mold carrier or mold table D has molds 36 of the usual character mounted near its periphery, and has upon its under side a plurality of stops 37 (one for each mold), which engage in succession a trigger or arm 38 secured to the shaft 5, thereby actuating the spout B on its forward movement. The mold carrier or mold table D is intended to be driven continuously and may be actuated by any suitable mechanism.

The mechanism for actuating the spout B for its return movement consists of a counter weight 39 attached to the trigger 38 by the cable 40 which is led over the pulley 41.

The operation of my device is as follows:
When the device is set in operation the glass flows through the opening 2 in the spout 3 and through the elongated aperture 10 into the auxiliary spout B, where the glass is maintained in molten condition by means of the blast through the nozzle 13. From the auxiliary spout or reservoir B the glass flows through the discharge orifice 11 of the spout B and the aperture 12 of the base plate 8 into the chamber 26 in the cut-off mechanism C, and from the cut-off mechanism C into the mold 36, which at that time is immediately beneath it.

The center of the discharge orifice 11 and the cut-off mechanism B are always maintained at the same distance from the axis of the mold table as are the centers of the molds, by reason of the concavity of the outwardly flaring face 19 of the track 17, against which the roller 20 is held by the counter weight 21. The auxiliary spout B also normally occupies the position indicated in Fig. 4 by reason of the fact that the weight 39 exerts a lateral pull on the trigger arm 38, so that when the trigger arm is not engaged by a stop 37 it will return and hold the spout B at the position indicated.

As the table D rotates in a clockwise direction, a mold 36 will move directly under the cut-off mechanism C at the point X. With a mold 36 and the cut-off mechanism C thus in alinement, a stop 37 will come in contact with the trigger arm 38, and will move it forward thereby rotating the shaft 5 and with it the auxiliary spout B, at a speed which will carry the discharge end 11 of the spout B along at a rate substantially equal to that of the travel of the mold 36 beneath it, and at the same time the roller 20, as it slides along the face 19 of the track 17, will cause the base plate 8, and with it the auxiliary spout B, to advance relatively of the supporting member 4, and thereby maintain the cut-off mechanism D and the orifice 11 in alinement with the mouth of the mold. The cut-off mechanism is so timed that as the return stroke of the spout B is completed and the end 32 of the counter weighted lever 31 has passed the spring finger 35 and is thus ready to be depressed to actuate the shaft 29 on the forward stroke, a stop 37 will come into contact with the trigger 38, which will rotate the spout B, and thereby cause the shaft 29 to be actuated to open the clam-shell members 25 and the glass will begin to run into the mold. The glass continues to run into the mold until the forward movement of the end 32 of the lever 31 has cleared the flange 33 and tilts upward thus rotating the shaft 29 to close the members 25. The stop 37 is arranged to clear the trigger 38 at substantially the same instant that the members 25 close and they will be immediately returned to the initial discharging position by means of the counter weight 39.

It is obvious that various modifications may be made in the mechanism which I have shown and described herein, without departing from my invention.

What I claim is:

1. In mechanism for making articles of glass, a continuously movable mold carrier, a plurality of molds mounted thereon, a spout in a furnace, a receptacle in position to receive glass from the furnace and to deliver it to the molds, delivery mechanism connected with the receptacle, and means adapted to maintain the delivery mechanism in vertical alinement with each successive mold during the discharge of the glass into such mold.

2. In mechanism for making articles of glass, a continuously movable mold carrier, a plurality of molds mounted thereon, a spout in a furnace, a receptacle having a pivotal mounting below the spout and being adapted for the reception of glass as it flows from the spout, delivery mechanism connected with the receptacle, and means for moving the receptacle independently of its pivotal mounting with its delivery mechanism in vertical alinement with each successive mold.

3. In mechanism for making articles of glass, a furnace spout, a receptacle positioned below the spout adapted to receive molten glass therefrom, the said receptacle having a pivotally movable support and being also movable horizontally on a line intersecting the axis of its support, a plurality of molds movable under one end of the receptacle and means for delivering the glass from the receptacle to the molds in succession.

4. In mechanism for making articles of glass, a furnace spout, a receptacle positioned below the spout adapted to receive molten glass therefrom, the said receptacle being comprised of fire clay and having in its upper face an elongated aperture adapted in all positions to remain in vertical alinement with the furnace spout, the said receptacle being positioned upon a base plate, the base plate being supported upon a rotatable member and being movable longitudinally thereto, and mechanism connected with the receptacle for delivering the glass from the receptacle into a plurality of molds in succession.

5. In mechanism for making articles of glass, a continuously movable mold carrier, a plurality of molds mounted thereon, a spout in a furnace, a receptacle beneath the spout mounted for pivotal and longitudinal movement, glass severing and supporting means connected with the receptacle, mechanism on the mold carrier adapted to move the receptacle in the direction of travel of the molds and means for returning the receptacle to initial position.

6. In mechanism for making articles of glass, a continuously movable mold carrier, a plurality of molds mounted thereon, a receptacle arranged to receive the glass as it flows from a furnace spout, an outlet from the receptacle and glass severing mechanism connected therewith, a support for the receptacle, the said receptacle having a pivotal movement about the axis of its support, and a concavely shaped member adapted to move the receptacle longitudinally of said support to maintain the outlet in alinement with each of said molds in succession.

THOMAS STENHOUSE.

Witnesses:
   JOHN F. WRENSHALL,
   ROBERT GOOD.